United States Patent
Bhogaraju et al.

(10) Patent No.: US 9,094,918 B2
(45) Date of Patent: Jul. 28, 2015

(54) APPARATUS AND METHODS FOR EFFICIENT POWER CONTROL FOR TUNE AWAY MODE IN A DSDS DEVICE

(71) Applicant: QUALCOMM Incorporated, San Diego, CA (US)

(72) Inventors: Karthik Pavan Krishna Bhogaraju, Hyderabad (IN); Anand Rajurkar, Hyderabad (IN); Manjunatha Subbamma Ananda, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/919,119

(22) Filed: Jun. 17, 2013

(65) Prior Publication Data

US 2013/0337861 A1 Dec. 19, 2013

Related U.S. Application Data

(60) Provisional application No. 61/660,957, filed on Jun. 18, 2012.

(51) Int. Cl.
*H04W 52/10* (2009.01)
*H04W 52/12* (2009.01)
(Continued)

(52) U.S. Cl.
CPC .............. *H04W 52/10* (2013.01); *H04W 52/12* (2013.01); *H04W 52/221* (2013.01); *H04W 52/223* (2013.01); *H04W 52/38* (2013.01); *H04W 52/44* (2013.01); *Y02B 60/50* (2013.01)

(58) Field of Classification Search
CPC .. H04B 1/1036; H04B 1/71637; H04B 1/719; H04M 3/42034; H04W 52/10; H04W 52/12; H04W 52/221; H04W 52/223; H04W 52/38; H04W 52/44

USPC .......................................... 455/522; 370/318
See application file for complete search history.

(56) References Cited

U.S. PATENT DOCUMENTS 7,447,516 B2 * 11/2008 Heo et al. ...................... 455/522
7,808,956 B2 * 10/2010 Petrie et al. .................... 370/337
(Continued)

FOREIGN PATENT DOCUMENTS

CN 101052203 A 10/2007
CN 201967137 U 9/2011
(Continued)

OTHER PUBLICATIONS

International Search Report and Written Opinion—PCT/US2013/046307—ISA/EPO—Aug. 12, 2013.

*Primary Examiner* — Bobbak Safaipour
(74) *Attorney, Agent, or Firm* — The Marbury Law Group, PLLC

(57) ABSTRACT

Methods and apparatus for wireless communication in mobile device that includes operating communication resources according to a first subscription to establish an active call at a certain transmit power. Aspects of the methods and apparatus include tuning away the communication resources to operate according to a second subscription. Aspects of the methods and apparatus include tuning back the communication resources to the first subscription from the second subscription. Aspects of the methods and apparatus also include calculating an adjusted transmit power for the first subscription and operating the first subscription on the adjusted transmit power.

32 Claims, 12 Drawing Sheets

(51) Int. Cl.
*H04W 52/22* (2009.01)
*H04W 52/44* (2009.01)
*H04W 52/38* (2009.01)

(56) References Cited

U.S. PATENT DOCUMENTS

| | | | |
|---|---|---|---|
| 8,351,366 B2 * | 1/2013 | Mohebbi et al. | 370/315 |
| 8,570,951 B1 * | 10/2013 | Rajurkar et al. | 370/328 |
| 8,825,814 B1 * | 9/2014 | Efrati | 709/220 |
| 8,832,289 B2 * | 9/2014 | Mocanu | 709/230 |
| 8,874,167 B2 * | 10/2014 | Qiu et al. | 455/557 |
| 2003/0186718 A1 | 10/2003 | Raaf et al. | |
| 2010/0081451 A1 | 4/2010 | Mueck et al. | |
| 2011/0077031 A1 | 3/2011 | Kim et al. | |
| 2011/0117909 A1 | 5/2011 | Cao et al. | |
| 2013/0023275 A1 | 1/2013 | Mutya et al. | |

FOREIGN PATENT DOCUMENTS

| | | |
|---|---|---|
| EP | 2 472 960 A1 | 4/2012 |
| WO | 0141492 A1 | 6/2001 |
| WO | 2006086656 A2 | 8/2006 |

* cited by examiner

APPARATUS AND METHODS FOR EFFICIENT POWER CONTROL FOR TUNE AWAY MODE IN A DSDS DEVICE

CLAIM OF PRIORITY UNDER 35 U.S.C §119

The present application for patent claims the benefit of priority to U.S. Provisional Application No. 61/660,957 entitled "APPARATUS AND METHODS FOR EFFICIENT POWER CONTROL FOR TUNE AWAY MODE IN A DSDS DEVICE" filed Jun. 18, 2012, and assigned to the assignee hereof and hereby expressly incorporated by reference.

BACKGROUND

1. Field

Aspects of the present disclosure relate generally to wireless communication systems, and more particularly to a mechanism for efficient power control for a tune away mode in a DSDS device.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Additionally, some wireless devices are configured to facilitate communication on two separate networks via two separate subscriptions. For instance, dual-subscriber identity module (SIM), dual standby (DSDS) devices may include two SIM cards—one card for a first subscription and a second card for a second subscription. Furthermore, each subscription may be associated with one or more technology types. For example, a first subscription may exclusively support 2 G communication technology, such as Global System for Mobile Communications (GSM), while the second subscription may support one or more 3 G communication technologies (e.g. Wideband Code Division Multiple Access (WCDMA)) and 2 G communication technology.

In DSDS devices, a user may establish a call, such as a voice call, data call, data session, text messaging session, or any other data transfer session, via one of the two subscriptions. Because most DSDS devices contain a single radio resource, such as a transceiver, where a first subscription has established an ongoing call with a first subscription network, a user equipment (UE) must tune the transceiver away to the second subscription at regular intervals to receive necessary paging signals and to transmit, for example, message acknowledgement signals and/or measurement indication signals. Therefore, while the first subscription continues an ongoing call, the transceiver may periodically tune away from the first subscription to the second subscription to receive such necessary paging and/or control information.

In some situations, power control (transmit power) poses a significant design problem in DSDS devices. Prior to tune away, the UE transmits at a certain transmit power. After the tune away is completed, the UE may have changed positions relative to the base station and the prior transmit power may no longer be suitable.

Therefore, improvements in the power control for tune away mode of DSDS devices are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method for improving power control for tune away mode of DSDS devices is provided. The method includes operating communication resources according to a first subscription to establish an active call at a certain transmit power. Additionally, the method includes tuning away the communication resources to operate according to a second subscription. Further, the method includes tuning back the communication resources to the first subscription from the second subscription. Still further, the method includes calculating an adjusted transmit power for the first subscription and operating the first subscription on the adjusted transmit power.

In another aspect, an apparatus for improving power control for tune away mode of DSDS devices is provided. The apparatus includes a processor configured to operate communication resources according to a first subscription to establish an active call at a certain transmit power. Additionally, the processor is configured to tune away the communication resources to operate according to a second subscription. Further, the processor is configured to tune back the communication resources to the first subscription from the second subscription. Still further, the processor is configured to calculate an adjusted transmit power for the first subscription and operate the first subscription on the adjusted transmit power.

In another aspect, an apparatus for improving power control for tune away mode of DSDS devices includes means for operating communication resources according to a first subscription to establish an active call at a certain transmit power. Additionally, the apparatus includes means for tuning away the communication resources to operate according to a second subscription. Further, the apparatus includes means for tuning back the communication resources to the first subscription from the second subscription. Still further, the apparatus includes means for calculating an adjusted transmit power for the first subscription and means for operating the first subscription on the adjusted transmit power.

In yet another aspect, a non-transitory computer-readable media storing machine-executable code for improving power control for tune away mode of DSDS devices that includes code for operating communication resources according to a first subscription to establish an active call at a certain transmit power. Additionally, the stored machine-executable code may include code for tuning away the communication resources to operate according to a second subscription. Further, the stored machine-executable code may include code for tuning back the communication resources to the first subscription from the second subscription. Still further, the stored machine-executable code may include code for calculating an adjusted transmit power for the first subscription and operating the first subscription on the adjusted transmit power.

These and other aspects of the disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure provides methods and apparatuses for efficiently improving the power control (transmit power) for tune away mode of a multi-SIM, multi-standby device, such as a dual-SIM, dual standby (DSDS) device. A DSDS device, also referred to as a user equipment (UE), in one aspect, may operate in a data transfer mode for one type of subscription and may operate in a page monitoring mode in another type of subscription. In other words, the UE may transfer communication resources from a first subscription to a second subscription when moving between modes of operation.

In a case where the UE may periodically tune away from a first subscription to a second subscription to receive certain paging information and tune back to the first subscription when the paging period is completed, which may take up to several milliseconds, the use of the transmit power of the UE prior to tune away may not be justified after tune back. For example, this may occur when the UE has not been stationary during the tune way and may have moved towards or away from the base station, thereby justifying a different transmit power as compared to the transmit power prior to tune way.

In other words, when the UE has moved towards the base station and the same transmit power before tune away is utilized, the UE may cause interference to other users as the given level of transmit power may not be needed based on the reduced distance to the base station. As a result of the UE transmitting at a higher transmit power to the base station then necessary, the network capacity of the whole system may be compromised if there are several DSDS device within the network. It should also be noted that higher power transmission may also lead to higher power consumption by the UE.

However, when the UE has moved away from the base station and the same transmit power before tune away is utilized, the UE transmit power may not be sufficient to meet the minimum power criteria for the signal to reach the base station, e.g., with a desired level of quality. This may result in throughput degradation of the information sent from the UE to the base station.

Figure 1:
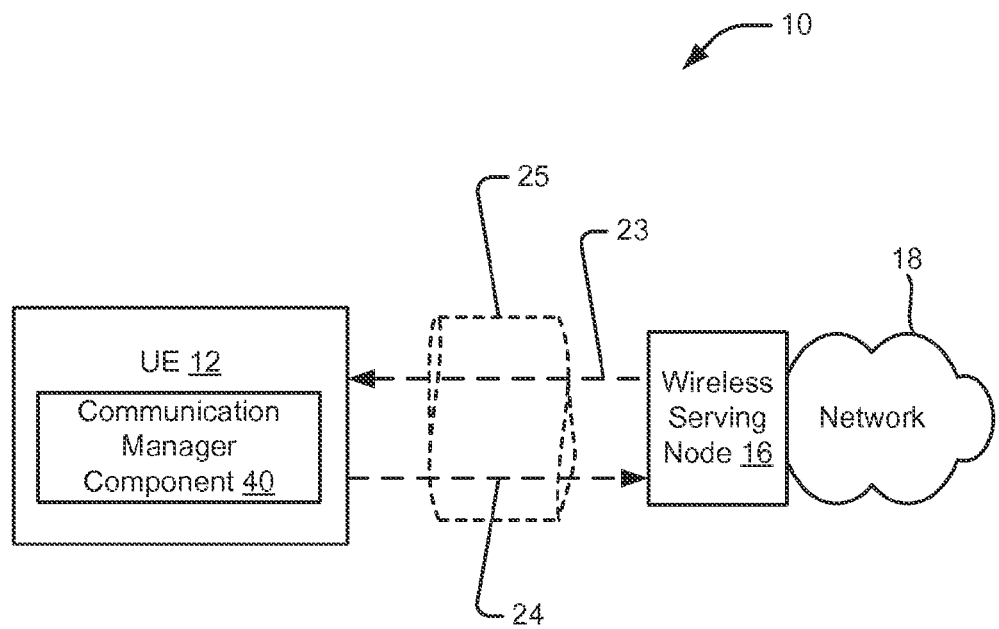
FIG. 1 is a schematic diagram illustrating an example wireless system suitable for implementing various aspects.

Referring to FIG. 1, in one aspect, a wireless communication system 10 is configured to facilitate transmitting vast amounts of data from a mobile device to a network at a fast data transfer rate. Wireless communication system 10 includes at least one UE 12 that may communicate wirelessly with one or more networks 18 via serving nodes, including, but not limited to, a wireless serving node 16 over one or more wireless links 25. The one or more wireless link 25, may include, but are not limited to, signaling radio bearers and/or the data radio bearers. The wireless serving node 16 may be configured to transmit one or more signals 23 to the UE 12 over the one or more wireless links 25, and/or the UE 12 may transmit one or more signals 27 to the wireless serving node 16. In an aspect, down link signals 23 and uplink signals 27 may include, but are not limited to, one or more messages, such as transmitting a data packet from the UE 12 to the network via the wireless serving node 16.

In an aspect, the UE 12 may include a communication manager component 40, which may be configured to transmit a data packet to the wireless serving node 16 over wireless link 25. Specifically, in an aspect, the communication manager component 40 of the UE 12 may be configured to manage multi-network communications to enable mobility of the UE 12, e.g. for a handover, and/or to seek to add to or improve communication quality and/or services.

The UE 12 may comprise a mobile apparatus and may be referred to as such throughout the present disclosure. Such a mobile apparatus or UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, a wireless serving node 16 of the wireless communication system 10, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of the wireless communication system 10 may include one or more small base stations, such as, but not limited to a femtocell, picocell, microcell, or any other small base station.

Figure 2:
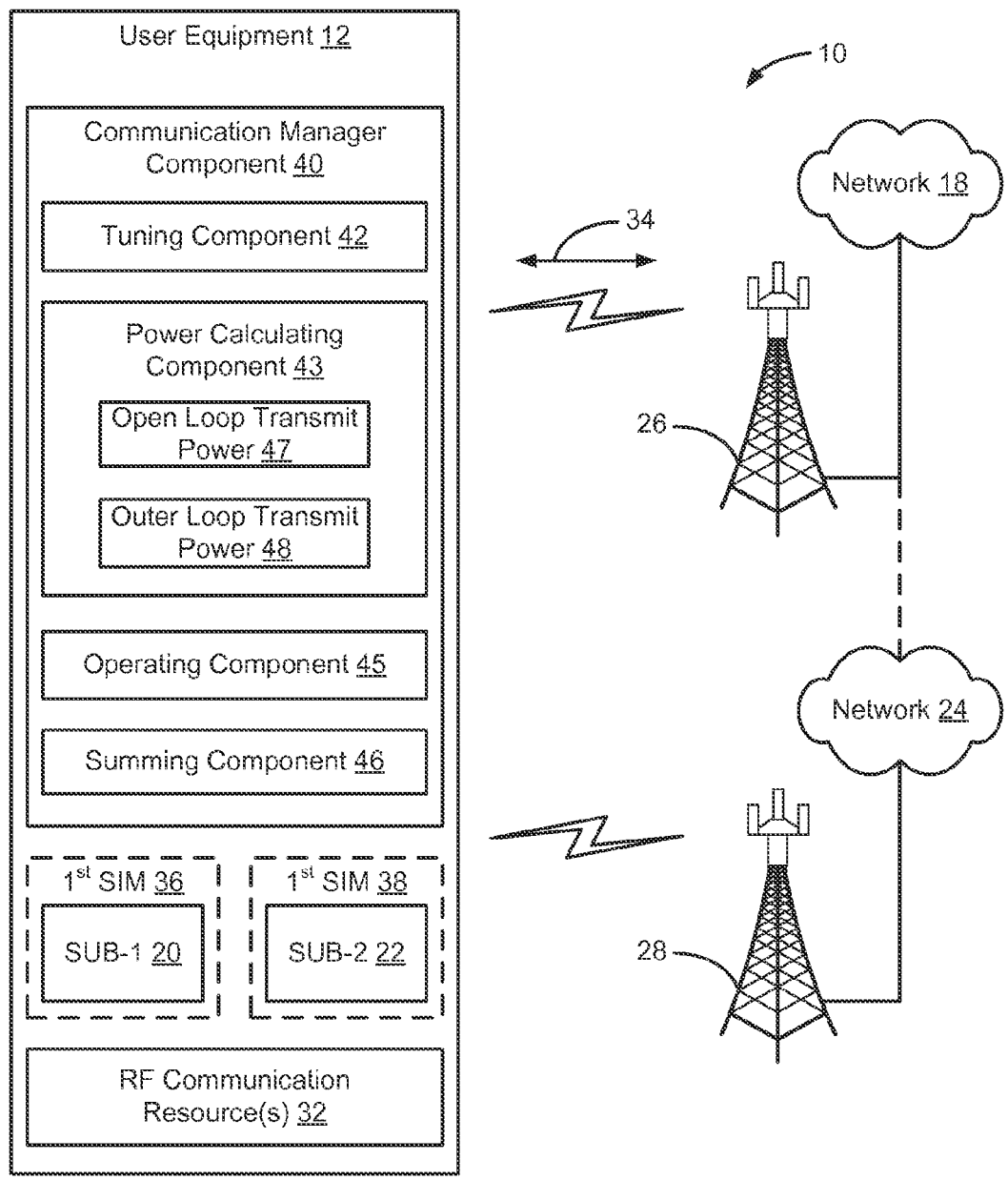
FIG. 2 is a block diagram illustrating an example wireless system suitable for implementing various aspects.

Referring to FIG. 2, in another aspect of the present apparatus and methods, a wireless communication system 10 includes user equipment (UE) 12 for performing a temporary tune back during a tune away mode to maintain an active call. For instance, the UE 12 can communicate with a first base station 26 and/or a second base station 28 utilizing multiple subscriptions to one or more networks 18 and 24, respectively. In an example, a UE 12 can have a first subscription 20 related to a first network 18 and second subscription 22 related to the same network, such as the first network 18, or to a different network, such as a second network 24. For instance, each subscription 20 and 22 may relate to a different account and/or different services on the same network or on different networks. In some aspects, each subscription 20 and 22 optionally may be maintained on a respective first subscriber identity module (SIM) 36 and a second SIM 38. As such, in one aspect, a UE 12 may be a multi-SIM, multi-standby device, such as a dual-SIM, dual standby (DSDS) device. Accordingly, a UE 12 can at least communicate in a first network 18 via a first base station 26 using a first subscription 20. The UE 12 can communicate in a second network 24 via first base station 26 and/or via a different base station, such as a second base station 28, using second subscription 22. Further, the first network 18 and second network 24 can use the same or different radio access technologies (RAT) to facilitate communicating with UEs. Additionally, the first base station 26 and the second base station 28 can each be a macrocell, picocell, femtocell, relay, Node B, mobile Node B, UE (e.g., communicating in peer-to-peer or ad-hoc mode with UE 12), or substantially any type of component that can communicate with a UE 12 to provide wireless network access via a subscription at the UE 12.

A UE 12 can include a communication manager component 40 configured to manage communication exchange signaling associated with a first subscription 20 and/or a second subscription 22 via one or more radio frequency (RF) communication resource(s) 32. For example, a communication manager component 40 may include and execute communication protocols and/or manage other standards-specific communication procedures using protocol- and/or standards-specific instructions and/or subscription-specific configuration information that allows communications with a first network 18 and a second network 24. Further, RF communication resource(s) 32 are configured to transmit and/or receive the communication exchange signaling to and/or from one or more base stations or other devices in the wireless communication system 10. For example, a RF communication resource(s) 32 may include, but are not limited to, one or more of a transmitter, a receiver, a transceiver, protocol stacks, transmit chain components, and receive chain components. In some aspects, RF communication resource(s) 32 may be dedicated to operate according to the standards and procedures of a single one of first subscription 20 or second subscription 22 at any given time. For instance, although not to be construed as limiting, RF communication resource(s) 32 may be associated with a multi-SIM, multi-standby device, such as a dual-SIM, dual standby (DSDS) device.

In an aspect, a communication manager component 40 may manage multi-network communication to enable mobility of UEs 12, e.g. for a handover, and/or to seek to add to or improve communication quality and/or services. In one case, for example, the communication manager component 40 may establish an active call 34 a using first subscription 20 with one network wireless network, for example a first network 18, while attempting to acquire and/or maintain communication and/or service using a second subscription 22 with the same network or with a different network, such as a second network 24. For example, the communication manager component 40 may be configured for operating RF communication resources 32 according to a first subscription 20 to establish an active call 34 at a first transmit power. In other words, the communication manager component 40 can establish active call 34 over a first network 18, related to a first subscription 20, via a first base station 26 at a first transmit power. Indeed, the UE 12 and the base station 26 can establish a connection to facilitate communicating in first network 18. Communications between the UE 12 and the first base station 26 can occur over logical channels, as described herein for example. The UE 12 can activate the call based on requesting call establishment from base station 26, receiving a page for an incoming call from base station 26, etc. Moreover, for example, an active call 34 can be a data call (e.g., voice over interne protocol (VoIP) or similar technologies) where the first network 18 is a packet-switched (PS) network, a voice call where the first network 18 is a circuit-switched (CS) network, and/or the like.

Further, the communication manager component 40 may also include a tuning component 42 configured to manage switching RF communication resources 32 from operating on an active call 34 according to a first subscription 20 to operating according to a second subscription 22 to acquire and/or maintain communication and/or service with the same or with a different network. For example, a tuning component 42 may maintain a periodic tune away timer and, upon expiration of the tune away timer, be configured to change operation of RF communication resources 32 and trigger the communication manager component 40 to communicate according to the second subscription 22. The execution of such a tune away, and the subsequent procedures, may be referred to as operating in a tune away mode. For instance, the tuning component 42 causes RF communication resources 32 to switch or re-initialize an operating state, such as from a first subscription operating state (e.g., for a first network communication or service, like WCDMA communication) supporting an active call 34 to a second subscription operating state (e.g., for a different first network service or for a different second network communication, like GSM communication).

As such, initiating the tune away mode may include, but is not limited to, one or more operations with respect to RF communication resources 32, such as performing a wake-up of the second subscription operating state, setting up a corresponding protocol stack for processing signals and data, enabling second subscription-related clocks, RF tuning including changing a receive and/or transmit frequency or frequency range of a transmitter or receiver or transceiver, and any other overhead procedure to enable communication using the second subscription 22. Further, once the second subscription operating state is enabled, the tuning component 42 can be configured to cause the UE 12 and/or communication manager component 40 to perform, using the second subscription 22, one or more procedures in the network, such as but not limited to page demodulation, idle mode monitoring procedures, periodic cell/location/routing updates, cell reselections, etc.

In one example, the tuning component 42 initiates tune away mode to communicate with a network different than the network supporting the active call 34, e.g. a second network 24, via a second base station 28. As such, the tuning component 42 enables RF communication resources 32 to determine whether idle-mode signals are received during the tune away mode from the second base station 28 corresponding to the second network 24. Idle-mode signals can relate to substantially any signal broadcast in the network, e.g. second network 24, such as paging signals, broadcast control channel (BCCH) signals, or other signals that can correlate to mobility of UE 12 or otherwise. As such, the tuning component 42 enables a UE 12 to perform at least a first procedure or a first set of procedures, including idle-mode procedures such as page demodulation.

Additionally, depending on a state of communications and/or movement of UE 12 or whether idle-mode signals are received, the tuning component 42 enables the UE device to perform additional procedures, such as but not limited to received signal processing (e.g. determining if a received page relates to second subscription 22 and optionally responding if so), periodic cell/location/routing updates, cell reselections, etc. It should be noted that such additional procedures may take a relatively long period of time, such as a period of time longer than an inactivity timer corresponding to an active call 34 of a first subscription 20.

Further, the communication manager component 40 may also include a power calculating component 43 that may be able to calculate a sufficient transmit power for the UE to communicate with a given base station, e.g. a transmit power after tune back for communicating with a first base station 26 associated with a first subscription 20, based on a tune away duration and a call duration prior to tune away. Indeed, the power calculating component 43 may be able to calculate an outer loop transmit power 47 as well as an open loop transmit power 48. In one aspect, open loop power control may be the transmit power determined according to a projected sum of the power control bits ($\Sigma$PCB) during tune away and tune back. In another aspect, the outer loop power control may be the transmit power determined according to the actual $\Sigma$PCB immediately prior to the tune away.

In another aspect, the communication manager component 40 may also include an operating component 45 capable of operating the first subscription 20 at the open loop transmit power 47 or operating the first subscription 20 at the outer loop transmit power 48 calculated by the power calculating component 43. In other words, after the power calculating component 43 has calculated the open loop power, the operating component 45 operates the first subscription 20 at the projected or calculated open loop power. Similarly, after the power calculating component 43 has calculated the outer loop transmit power 48, the operating component 45 operates the first subscription 20 at the projected or calculated outer loop power.

Still further, the communication manager component 40 may also be configured to include a summing component 46 that sums actual and/or projected power control bits (PCB) received by the UE 12 from a base station 26 associated with a first subscription 20 to determine a transmit power after tune back. In other words, during communication with the base station 26, the UE 12 receives PCBs from first base station 26 that control the transmit power of the UE 12. Based on a relationship defined herein between a tune away duration and a call duration prior to tune away, the operating component 45, power calculating component 43, and tuning component 42 operates in conjunction with a summing component 46, which sums up either actual and/or projected PCBs, in order to determine the transmit power after tune back.

As such, in one aspect when the tune away duration is less than or equal to the actual call duration prior to tune away, the summing component 46 may also operate in conjunction with the operating component 45, the power calculating component 43, and the tuning component 42 to calculate a projected $\Sigma$PCB during the period of tune away and tune back in order to calculate the open loop transmit power. In another aspect, when the tune away duration is greater than the actual call duration prior to tune away, the summing component 46 may operate in conjunction with the operating component 45, the power calculating component 43, and the tuning component 42 to calculate the actual $\Sigma$PCB immediately prior to tune away for the outer loop transmit power.

Figure 3:
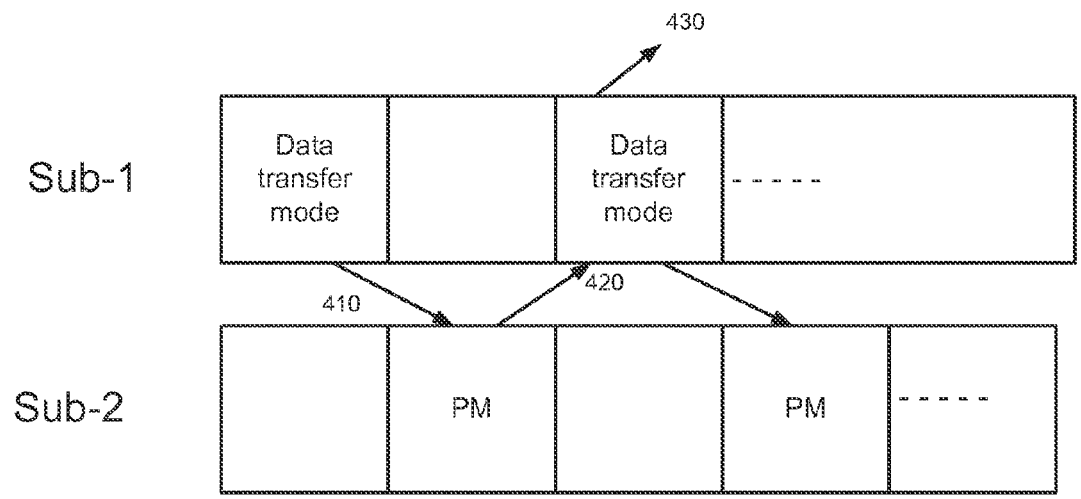
FIG. 3 is a schematic diagram of transferring communications resources from a first subscription to a second subscription.

FIG. 3 illustrates one aspect of tune away when the UE 12 may operate in a data transfer mode for the first subscription 20 and may operate in a page monitoring mode for the second subscription 22. Initially, the UE 12 operates the first subscription 20 in a data transfer mode. At period 410, when the second subscription 22 requests the use of the RF communication resources 32, the tuning component 42 tunes away to the second subscription 22 for page monitoring (PM). After completion of the PM, the RF communication resources 32 are transferred or tuned back to the first subscription 20 at period 420. However, the suitable transmit power for the first subscription 20 after period 420 may not be the same as the transmit power before the period 410.

As stated previously, if the UE has moved towards the base station and the transmit power before tune away is utilized, the UE may cause interference to other users due to the transmit power being higher than desired. If, however, the UE has moved away from the base station and the same transmit power before tune away is utilized, the UE transmit power may not be sufficient to meet the minimum power criteria for proper communication with the base station.

To alleviate this power control problem, the transmit power during the period 430 may be either in the form of open loop power control or outer loop power control. As stated previously, open loop power control may be the transmit power determined according to a projected sum of the power control bits ($\Sigma$PCB) during tune away. On the other hand, the outer loop power control may be the transmit power determined according to the actual $\Sigma$PCB received immediately prior to the tune away.

In an aspect, the following equation is used to calculate the transmit power in open loop power control for CMDA:

$$\text{Mean output power (dBm)} = -\text{mean input power (dBm)} + \text{offset power} + \text{interference correction from the last access probe} + \text{NOM\_PWR} - 16 \times \text{NOM\_PWR\_EXT} + \text{INIT\_PWR} + \Sigma\text{PCB},$$

where interference correction=min(max(−7−ECIO, 0), 7 1), ECIO is the Ec/I0 (dB) of the strongest active set pilot, and offset power is −73 dB(Cellular) and −76 dB(PCS).

NOM_PWR, NOM_PWR_EXT and INIT_PWR are constants which are transmitted by the network and $\Sigma$PCB is the power control history from the beginning of the call.

It should also be noted that the above equation utilizes projected $\Sigma$PCB for the duration of tune away in addition to the available history and the projected $\Sigma$PCB value is calculated to get a more accurate open loop estimate for UE after tune back.

Figure 4:
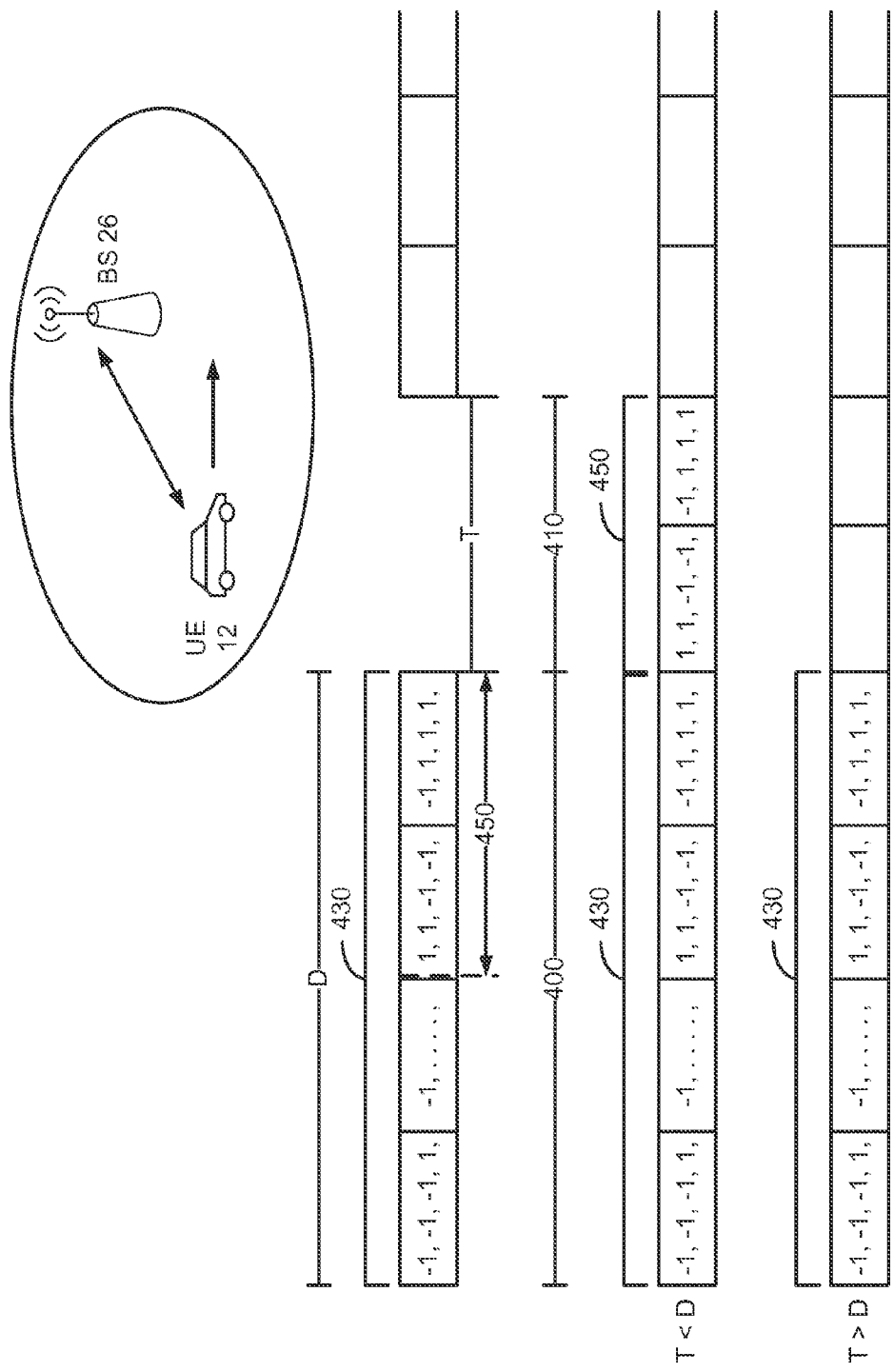
FIG. 4 is a schematic diagram illustrating use of PCBs to calculate the transmit power of a user equipment for transmissions to a base station after tune back from the second subscription to the first subscription.

FIG. 4 exemplifies the operation of tune away for the UE 12 and illustrates calculation of ΣPCB during tune away. FIG. 4 illustrates the UE 12 moving relative to a base station 26, and although the UE 12 is illustrated as moving via a vehicle, it should be understood that the present aspects contemplate any type of movement of UE 12 relative to the base station 26.

When the UE 12 communicates with the base station 26 during period 400, a ΣPCB 430 is received from the base station to adjust the transmit power of the UE 12. Period 410 represents the tune away time T in which the RF communication resources 32 have been transferred from the first subscription 20 to the second subscription 22 and transferred back to the first subscription 20. Period 400 represents the active call duration prior to tune away, also referred to as D.

After the UE 12 tunes back to the first subscription 20 from the second subscription 22, the ΣPCBs to use to calculate transmit power for the UE 12 to use after the tune away period 410 may be determined based on the tune away time T relative to the active call duration, D, prior to tune away. For instance, when the tune away time T is less than the call duration, D, prior to tune away, a projected ΣPCB 450 may be used, in some cases in addition to the ΣPCB 430 prior to tune away, to calculate an adjustment to the transmit power of the UE 12 after tune back, e.g. at the end of tune away period 410. To determine the projected ΣPCB 450, the communication manager component 40 looks back at the history of the ΣPCB 430 prior to tune away and utilizes the ΣPCB equal to the tune away time T, e.g. the PCBs in a time x as illustrated in FIG. 4, where x=T. In other words, if T<D, then the projected ΣPCB 450 during tune away may be used (in some aspects in addition to the ΣPCB 430 prior to tune away) to adjust the transmit power of the UE 12. This calculation is referred to as the projected open loop transmit power 47.

If the tune away time T is greater than the call duration D, a projected ΣPCB 430 may not be able to be determined, therefore only the ΣPCB 430 prior to tune away may be used to calculate the transmit power of the UE 12. In other words, if T>D, then the ΣPCB 430 prior to tune away may be utilized to adjust the transmit power of the UE 12. This calculation is referred to as the outer loop transmit power 48.

In a specific CDMA example, consider that the UE 12 UE tunes away from the base station and tunes back after an average tune away duration of 60 ms where the step size for the power control is 0.5 dB. (Note the tune away duration can vary depending on reselections and out-of-service scenarios). Additionally assume that the base station sends 75% down power commands and 25% up power commands during the tune away duration because the UE 12 is approaching the base station. As such, for a duration of 60 ms, the UE 12 would receive 48 PCBs (in CDMA, on ePCB is 1.25 ms) during tune away which corresponds to a power change of (48×(−0.75)+ 48×(+0.25))×(0.5 dB)=−12 dB.

Therefore, if the UE 12 follows the same power control as before the tune away then the UE 12 will be transmitting at a power level which is higher by 12 dB. This high power will cause interference at the base station 26, thereby decreasing the network capacity. To resolve this issue, the UE 12 would utilize the calculated open loop transmit power 47 to determine the necessary transmit power and minimum FER requirements for proper communication with the base station 26 without overloaded the network capacity.

Similarly, if the UE 12 moves away from the base station 26 and again considering sending 75% up power commands and 25% down power commands, the UE 12 transmits at a power which is lower by 12 dB than required after tune back, resulting in throughput degradation. To resolve this issue, the UE 12 would utilize the calculated outer loop transmit power 48 to determine the necessary transmit power and minimum FER requirements for proper communication with the base station 26 without throughput degradation.

Figure 5:
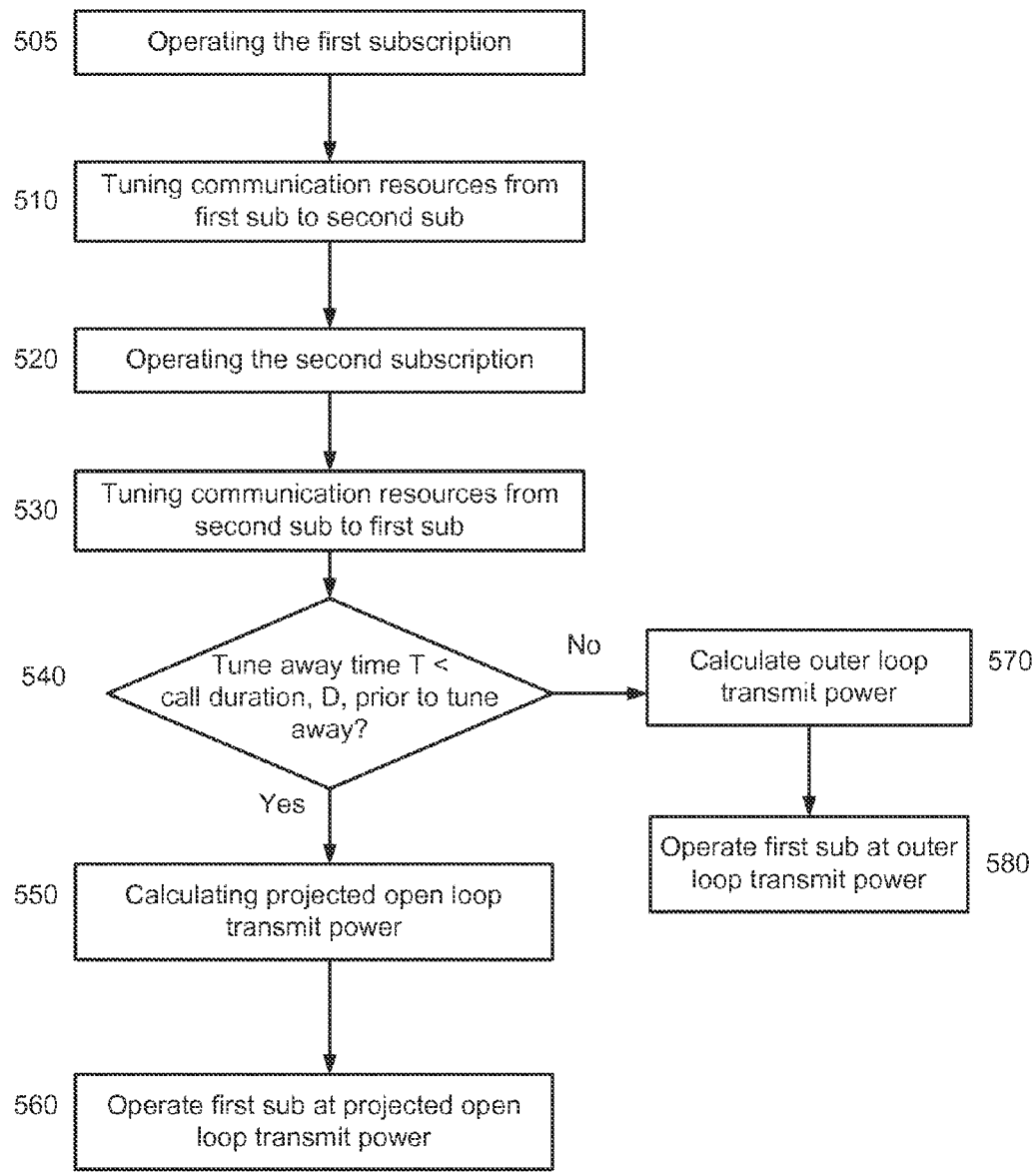
FIG. 5 is flow diagram illustrating an aspect method for calculating the transmit power after tune away.

FIG. 5 is flow diagram that illustrates an exemplary method 500 of a tune away mode in DSDS devices. In an aspect, the method 500 may be performed by a UE (e.g. UE 12 of FIG. 2), and may be performed by a processor or other component capable of executing computer-executable instructions for performing the steps of FIG. 5. In some examples the method 500 may include a UE with a communication manager component 40 (FIG. 2) and/or one or more components thereof, such as a tuning component 42 (FIG. 2), power calculating component 43 (FIG. 2), operating component 45 (FIG. 2), and summing component 46 (FIG. 2).

At block 505, the UE is configured for operating RF communication resources according to a first subscription to establish an active call. In other words, a first subscription 20 is operated in data transfer mode at a certain transmit power. For example, the communication manager component 40 may be configured to execute instructions for operating RF communication resources 32 according to a first subscription 20 to establish an active call 34 at a certain transmit power.

At block 510, the UE is configured for tuning away the communication resources to operate according to a second subscription. For example, the tuning component 42 may be configured to execute instructions for tuning the RF communication resources 32 away from the first subscription 20 and to the second subscription 22. As such, operating the second subscription 22 in page monitoring mode occurs at block 520.

At block 530, is configured for tuning back the communication resources to the first subscription from the second subscription. For example, the tuning component 42 may be configured to execute instructions for tuning the RF communication resources 32 back to the first subscription 20 from the second subscription 22 when the page monitoring of the second subscription 22 is completed.

At block 540, the communication manager 30 determines if a tune away time T is less than an active call duration, D, prior to tune away. If the tune away time T is less than the call duration prior to tune away, D, a calculation of a projected open loop transmit power for the first subscription occurs at block 550. At block 560, the first subscription is operated in the data transfer mode at the projected open loop transmit power. For example, the UE is configured for executing instructions for calculating and operating an open loop transmit power 47 for the first subscription 20 (after the tuning back) when a tune away time, T, is less than a call duration prior to tuning away, D.

If the tune away time T is greater than the call duration prior to tune away, D, a calculation of an outer loop transmit power for the first subscription occurs at block 570. At block 580, the first subscription is operated in the data transfer mode at the outer loop transmit power. For example, the UE is configured for executing instructions for calculating and operating an outer loop transmit power 48 for the first subscription 20 (after tuning back) when the tune away time, T, is greater than or equal to the call duration prior to the tuning away, D.

Figure 6:
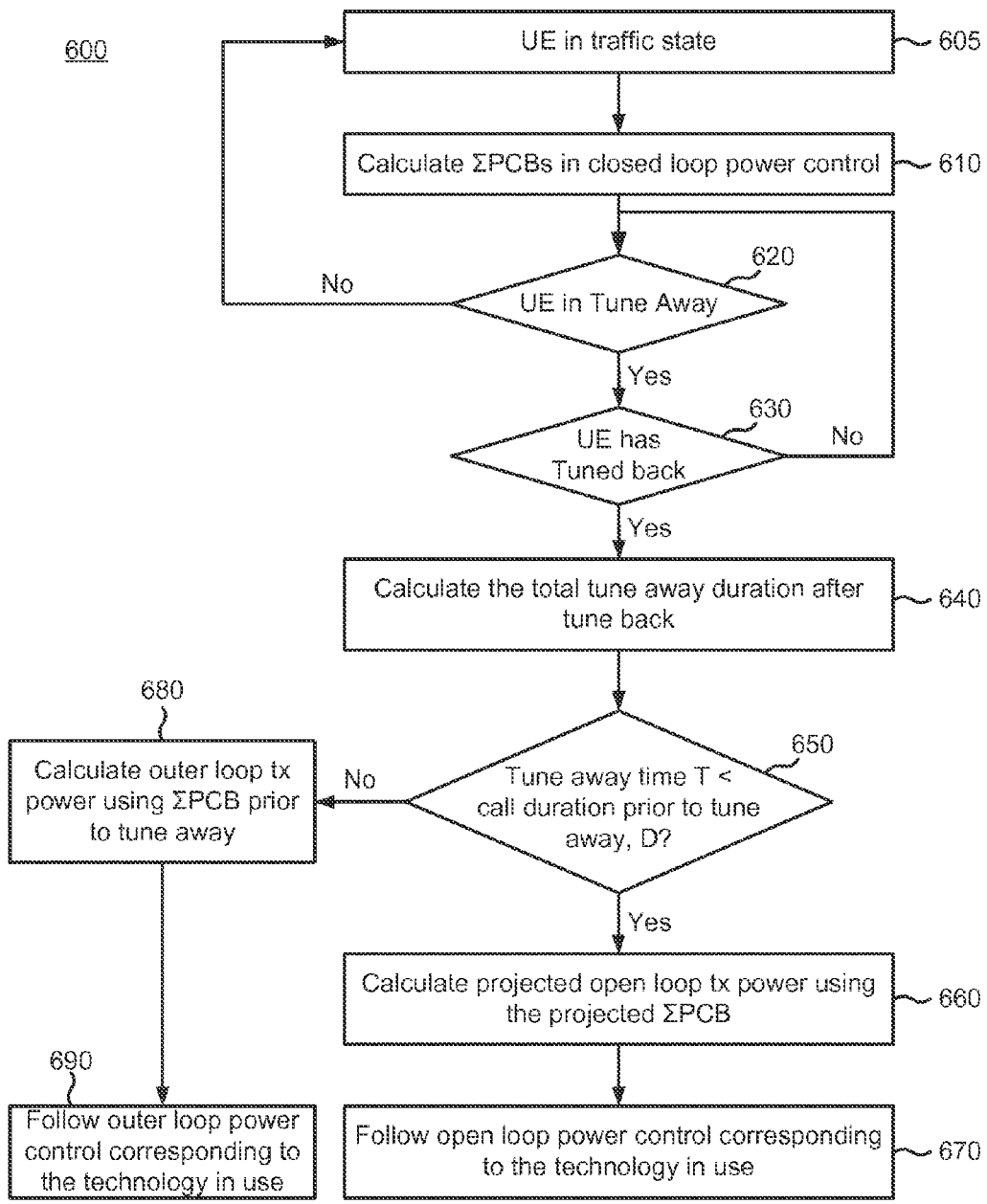
FIG. 6 is flow diagram illustrating another aspect method for calculating the transmit power after tune away.

FIG. 6 is flow diagram that illustrates another exemplary method 600 of a tune away mode in DSDS devices taking into account the calculation of PCBs while the UE is in traffic mode. In an aspect, the method 600 may be performed by a UE (e.g. UE 12 of FIG. 2), and may be performed by a processor or other component capable of executing computer-executable instructions for performing the steps of FIG. 6. In some examples the method 600 may include a UE with a communication manager component 40 (FIG. 2) and/or one or more components thereof, such as tuning component 42

(FIG. 2), power calculating component 43 (FIG. 2), operating component 45 (FIG. 2), and summing component 46 (FIG. 2).

At block 605, the UE 12 is in a traffic state with the base station 26. Calculation of the ΣPCB in a closed loop power control occurs at 610. At block 620, a determination is made if the UE 12 has tuned away from the first subscription. If the UE 12 has not tuned away from the first subscription, the UE 12 is determined to be in a traffic state with the base station 26.

If the UE 12 has tuned away from the first subscription, the UE 12 is determined to be in a tune away state. At block 630, another determination is made regarding whether the UE 12 has tuned back to the first subscription. If the UE 12 has not tuned back to the first subscription, the UE 12 is determined to be in a tune away state. If the UE 12 has tuned back to the first subscription, then at block 640, the tune away time T is calculated.

At block 650, the communication manager 30 determines whether a tune away time T is less than an active call duration prior to tune away, D. If the tune away time T is less than the call duration prior to tune away, D, the calculation of a projected open loop transmit power using the projected ΣPCB for the first subscription occurs at block 660. At block 670, the first subscription is operated in the data transfer mode at the projected open loop transmit power.

If the tune away time T is not less than the call duration prior to tune away, D, a calculation of an outer loop transmit power for the first subscription occurs at block 680. At block 690, the first subscription is operated in the data transfer mode at the outer loop transmit power.

Figure 7:
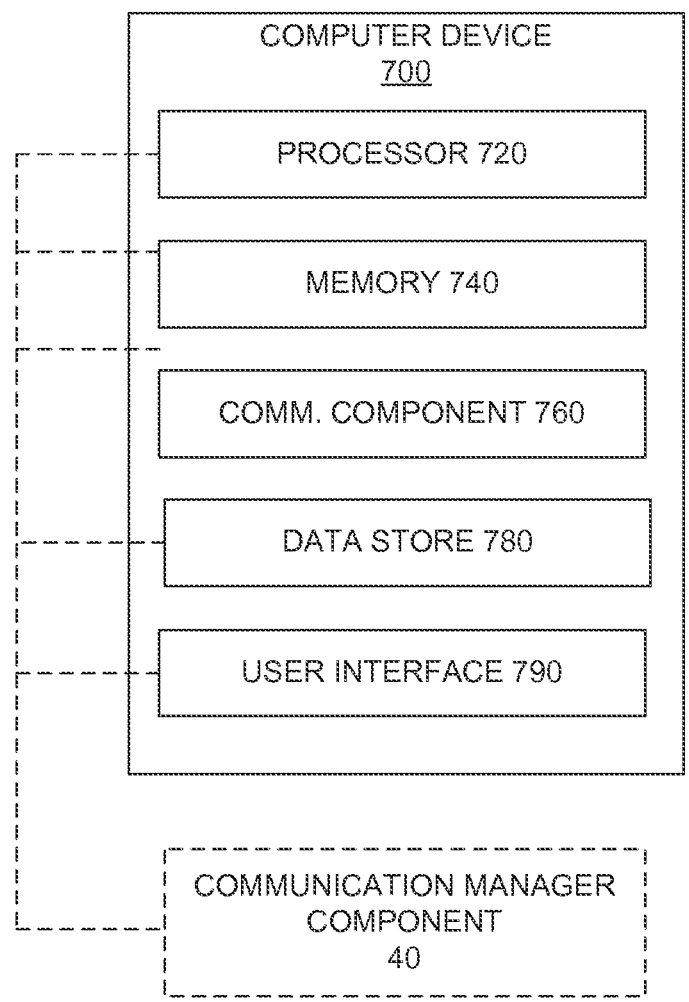
FIG. 7 is a block diagram illustrating additional example components of an aspect of a computer device having a call processing component according to the present disclosure.

Referring to FIG. 7, in one aspect, the UE 12 of FIGS. 1 and 2 may be represented by a specially programmed or configured computer device 700, wherein the special programming or configuration includes a communication manager component 40, as described herein. For example, for implementation as a UE 12 (FIG. 2), a computer device 700 may include one or more components for computing and transmitting a data frames from a UE 12 to a network 18 via a wireless serving node 16, such as in specially programmed computer readable instructions or code, firmware, hardware, or some combination thereof. Such a computer device 700 includes a processor 720 for carrying out processing functions associated with one or more of components and functions described herein. The processor 720 can include a single or multiple set of processors or multi-core processors. Moreover, the processor 720 can be implemented as an integrated processing system and/or a distributed processing system.

The computer device 700 further includes a memory 740, such as for storing data and/or local versions of applications being executed by the processor 720. The memory 740 can include any type of memory usable by a computer, such as random access memory (RAM), read only memory (ROM), tapes, magnetic discs, optical discs, volatile memory, non-volatile memory, and any combination thereof.

Further, the computer device 700 includes a communications component 760 that provides for establishing and maintaining communications with one or more parties utilizing hardware, software, and services as described herein. The communications component 760 may carry communications between the components on computer device 700, as well as between computer device 700 and external devices, such as devices located across a communications network and/or devices serially or locally connected to the computer device 700. For example, the communications component 760 may include one or more buses, and may further include transmit chain components and receive chain components associated with a transmitter and receiver, respectively, or a transceiver operable for interfacing with external devices. For example, in an aspect, a receiver of the communications component 760 operates to receive one or more data frames or packets via a wireless serving node 16, which may be a part of the memory 740. Also, for example, in an aspect, a transmitter of the communications component 760 operates to transmit one or more data frames or packets from the UE 12 to a network 18 via a wireless serving node 16 over a link 25.

Additionally, the computer device 700 may further include a data store 780, which can be any suitable combination of hardware and/or software, that provides for mass storage of information, databases, and programs employed in connection with aspects described herein. For example, the data store 780 may be a data repository for applications not currently being executed by the processor 720.

The computer device 700 may additionally include a user interface component 790 operable to receive inputs from a user of the computer device 700, and further operable to generate outputs for presentation to the user. The user interface component 790 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the user interface component 790 may include one or more output devices, including but not limited to a display, a speaker, a haptic feedback mechanism, a printer, any other mechanism capable of presenting an output to a user, or any combination thereof.

The computer device 700 may include, or may be in communication with, a communication manager component 40, which may be configured to perform the functions described herein.

Figure 8:
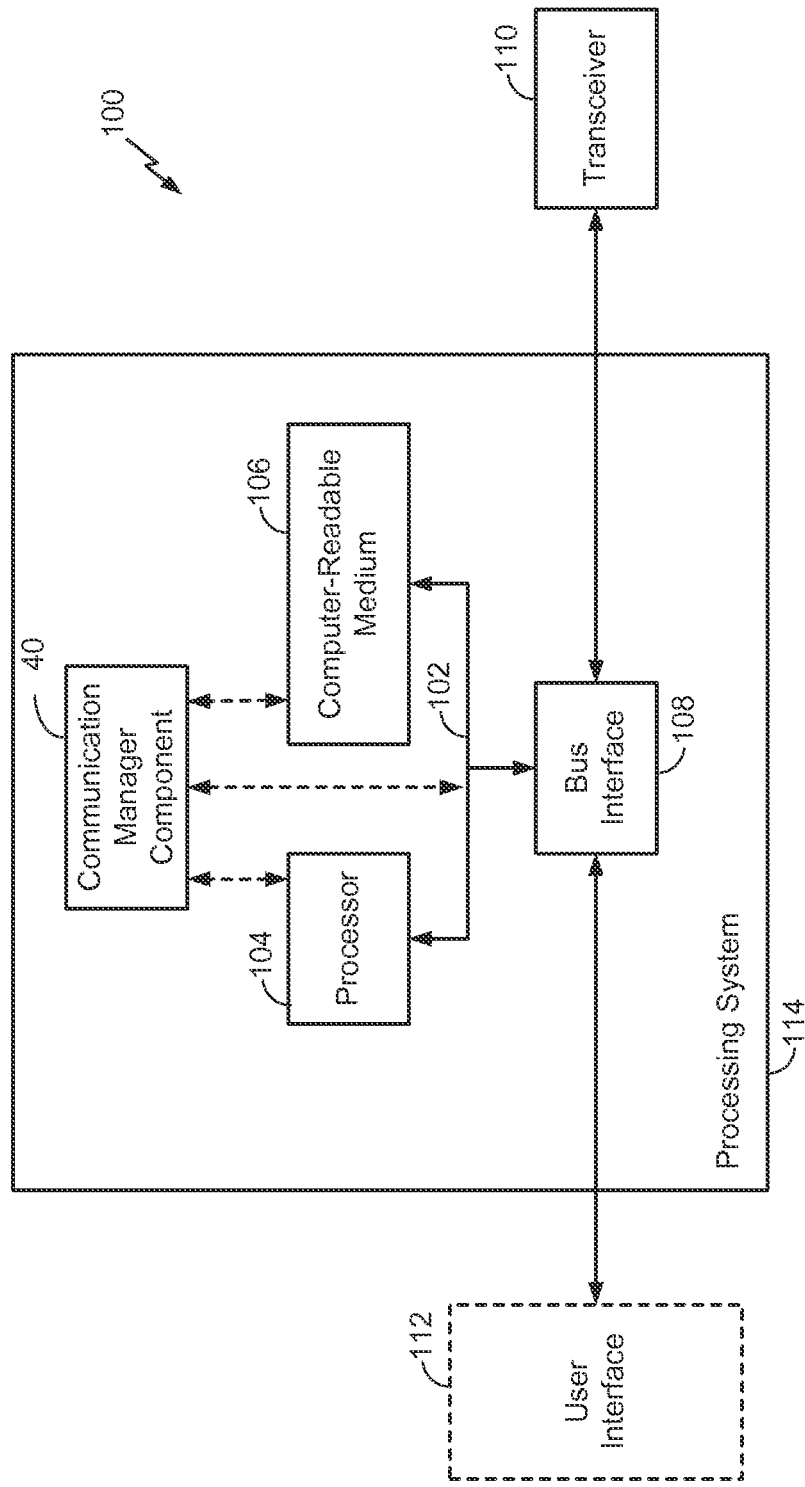
FIG. 8 is a block diagram illustrating an example of a hardware implementation for an apparatus employing a processing system to perform the functions described herein.

FIG. 8 is a block diagram illustrating an example of a hardware implementation for an apparatus 100 employing a processing system 114. The apparatus 100 may be configured to include, for example, a wireless communication system 10 (FIGS. 1 and 2) and/or a communication manager component 40 (FIGS. 1 and 2) implementing the components described above, such as, but not limited to the tuning component 42, power calculating component 43, operating component 45, and summing component 46, as described above. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the non-transitory computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the non-transitory computer-readable medium 106. The software, when executed by the processor 104, causes the processing system 114 to perform the various functions described herein for any particular apparatus. The non-transitory computer-readable medium 106 may also be used for storing data that is manipulated by the processor 104 when executing software.

In an aspect, the processor 104, non-transitory computer-readable medium 106, or a combination of both may be configured or otherwise specially programmed to perform the functionality of the communication manager component 40 (FIGS. 1 and 2) as described herein.

The various concepts presented throughout this disclosure may be implemented across a broad variety of telecommunication systems, network architectures, and communication standards.

Figure 9:
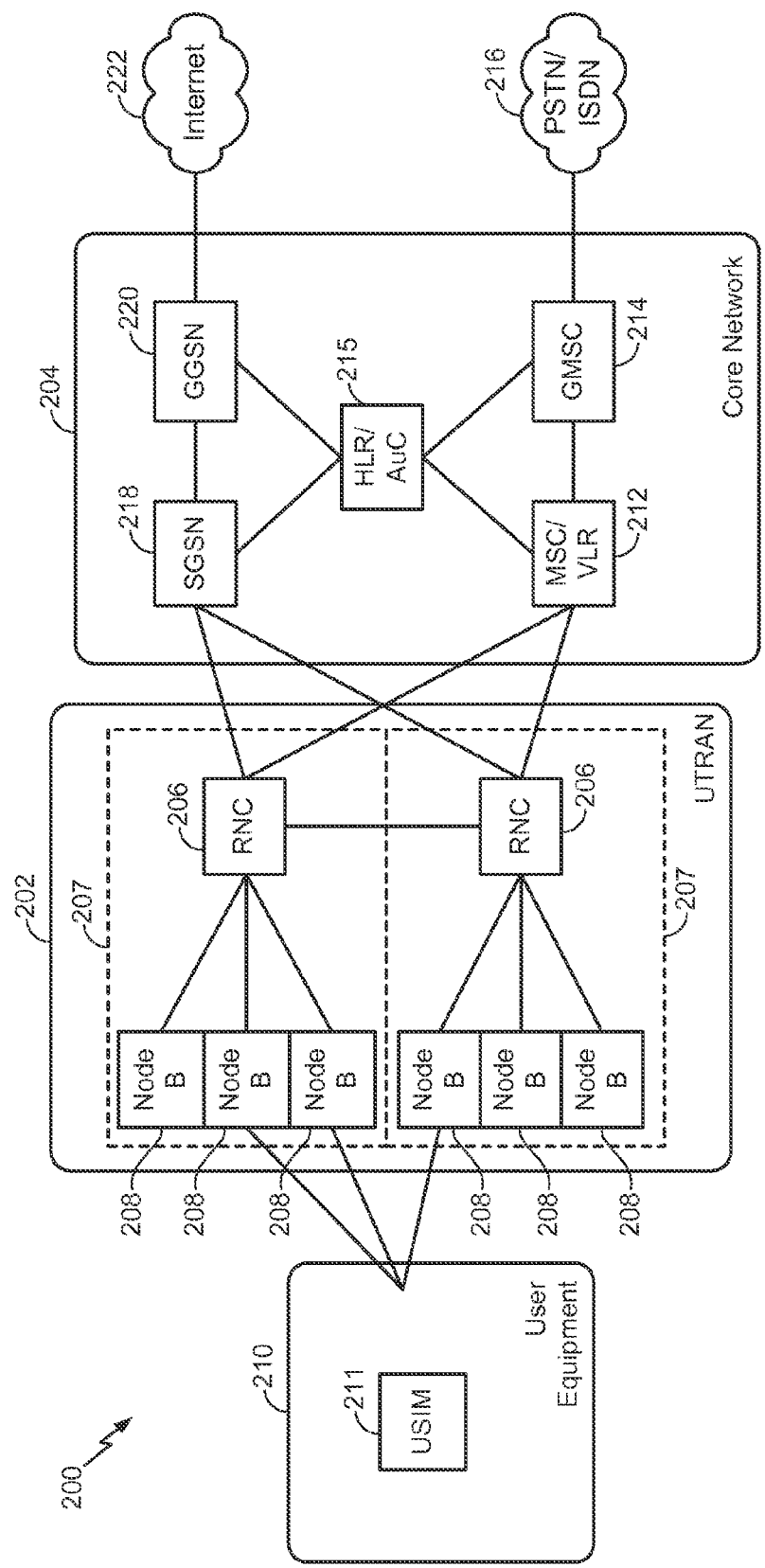
FIG. 9 is a block diagram conceptually illustrating an example of a telecommunications system including a UE configured to perform the functions described herein.

Referring to FIG. 9, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be configured to include, for example, the communication manager component 40 (FIGS. 1 and 2) implementing the components described above, such as, but not limited to the tuning component 42, power calculating component 43, operating component 45, and summing component 46. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs.

The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device.

The UE 210 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 10:
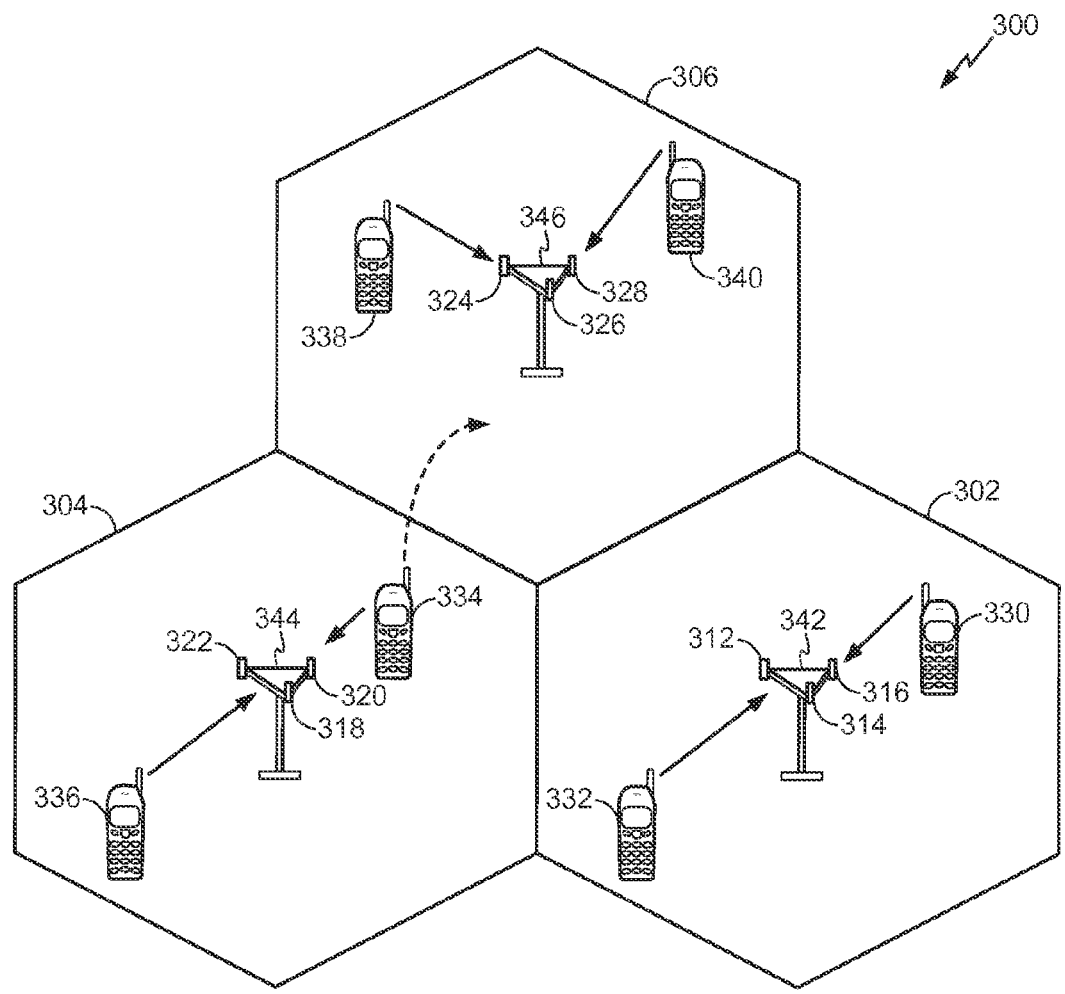
FIG. 10 is a conceptual diagram illustrating an example of an access network for use with a UE configured to perform the functions described herein.

Referring to FIG. 10, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 4) for all the UEs 330, 332, 334, 336, 338, 340 in the respective cells 302, 304, and 306. Node Bs 342, 344, 346 and UEs 330, 332, 334, 336, 338, 340 respectively may be configured to include, for example, the communication manager component 40 (FIGS. 1 and 2) implementing the components described above, such as, but not limited to the tuning component 42, power calculating component 43, operating component 45, and summing component 46.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 4), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 11.

Figure 11:
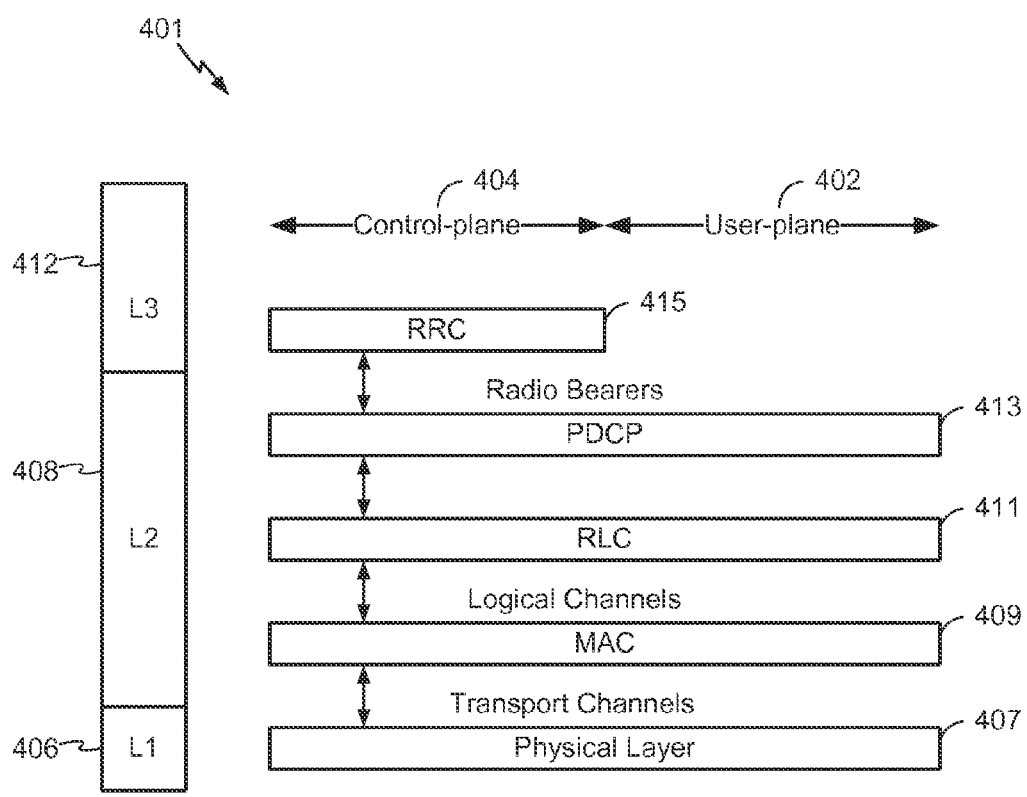
FIG. 11 is a conceptual diagram illustrating an example of a radio protocol architecture for the user and control planes for a base station and/or a UE configured to perform the functions described herein.

FIG. 11 is a conceptual diagram illustrating an example of the radio protocol architecture 401 for the user plane 402 and the control plane 404 of a user equipment (UE) or node B/base station. For example, the architecture 401 may be included in a network entity and/or UE such as an entity within network 18 and/or a UE 12 (FIGS. 1 and 2). The radio protocol architecture 401 for the UE and node B is shown with three layers: Layer 1 406, Layer 2 408, and Layer 3 412. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 412 includes a radio resource control (RRC) sublayer 415. The RRC sublayer 415 handles the control plane signaling of Layer 3 412 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 12:
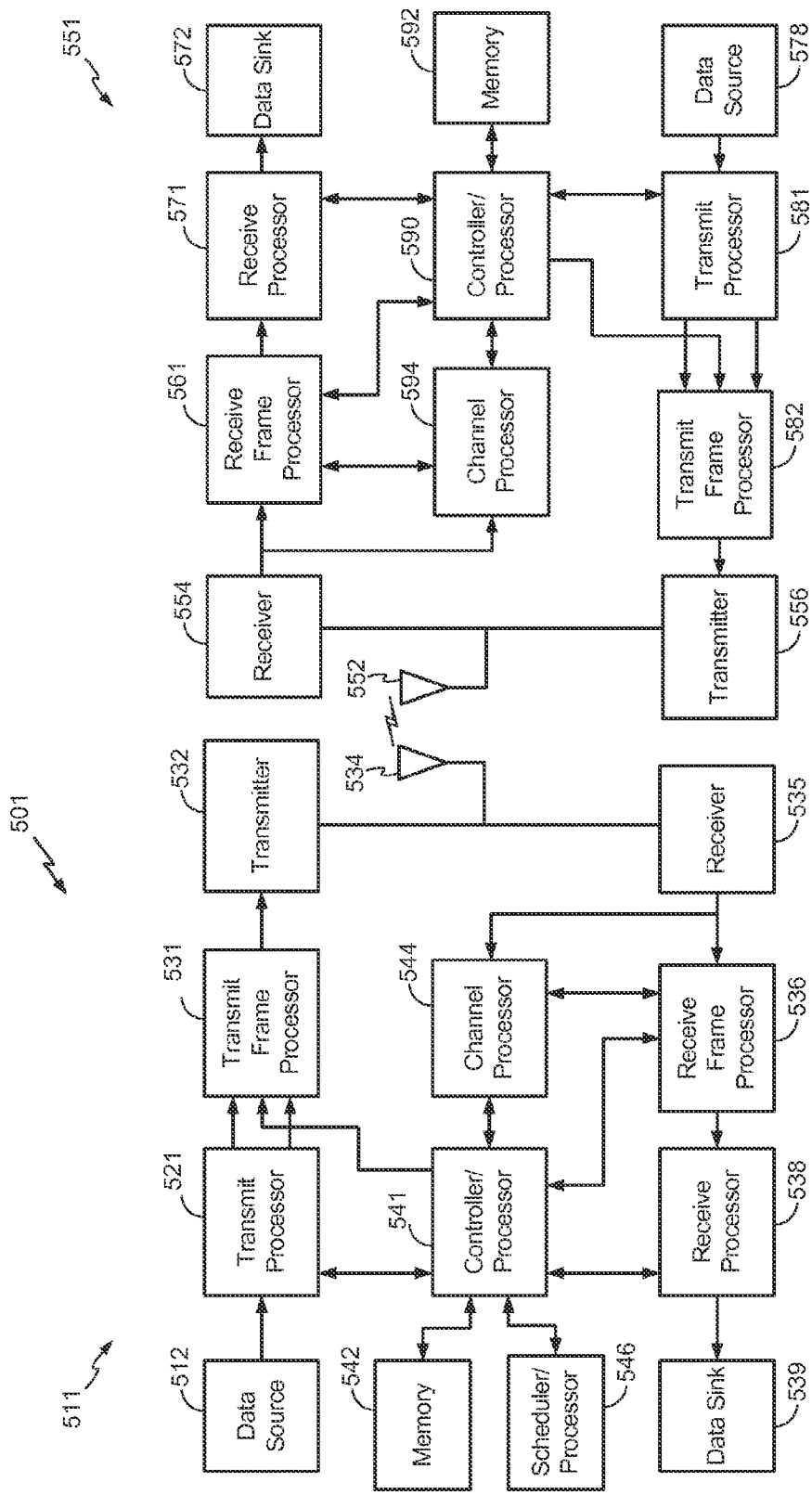
FIG. 12 is a block diagram conceptually illustrating an example of a Node B in communication with a UE in a telecommunications system configured to perform the functions described herein.

FIG. 12 is a block diagram of a communication system 501 including a Node B 511 in communication with a UE 551, where the Node B 511 may be an entity within the network 18 and the UE 551 may be the UE 12 according to the aspect described in FIGS. 1 and 2. In the downlink communication, a transmit processor 521 may receive data from a data source 512 and control signals from a controller/processor 541. The transmit processor 521 provides various signal processing functions for the data and control signals, as well as reference signals (e.g., pilot signals). For example, the transmit processor 521 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 541 to determine the coding, modulation, spreading, and/or scrambling schemes for the transmit processor 521. These channel estimates may be derived from a reference signal transmitted by the UE 551 or from feedback from the UE 551. The symbols generated by the transmit processor 521 are provided to a transmit frame processor 531 to create a frame structure. The transmit frame processor 531 creates this frame structure by multiplexing the symbols with information from the controller/processor 541, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 551, a receiver 554 receives the downlink transmission through an antenna 552 and processes the transmission to recover the information modulated onto the carrier. The information recovered by the receiver 554 is provided to a receive frame processor 561, which parses each frame, and provides information from the frames to a channel processor 594 and the data, control, and reference signals to a receive processor 571. The receive processor 571 then performs the inverse of the processing performed by the transmit processor 521 in the Node B 511. More specifically, the receive processor 571 descrambles and despreads the symbols, and then determines the most likely signal constellation points transmitted by the Node B 511 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 551 and/or various user interfaces (e.g., display). Control signals carried by successfully decoded frames will be provided to a controller/processor 590. When frames are unsuccessfully decoded by the receiver processor 571, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 581. The data source 578 may represent applications running in the UE 551 and various user interfaces (e.g., keyboard). Similar to the functionality described in connection with the downlink transmission by the Node B 511, the transmit processor 581 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 511 or from feedback contained in the midamble transmitted by the Node B 511, may be used to select the appropriate coding, modulation, spreading, and/or scrambling schemes. The symbols produced by the transmit processor 581 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 511 in a manner similar to that described in connection with the receiver function at the UE 551. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 581 in the UE 551. The data and control signals carried by the successfully decoded frames may then be provided to a data sink 539 and the controller/processor, respectively. If some of the frames were unsuccessfully decoded by the receive processor, the controller/processor 541 may also use an acknowledgement (ACK) and/or negative acknowledgement (NACK) protocol to support retransmission requests for those frames.

The controller/processors 541 and 590 may be used to direct the operation at the Node B 511 and the UE 551, respectively. For example, the controller/processors 541 and 590 may provide various functions including timing, peripheral interfaces, voltage regulation, power management, and other control functions. The computer readable media of memories 542 and 592 may store data and software for the Node B 511 and the UE 551, respectively. A scheduler/processor 546 at the Node B 511 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 7 or 8) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium 106 (FIG. 8). A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The non-transitory computer-readable medium may be resident in the processing system, external to the processing system, or distributed across multiple entities including the processing system. The non-transitory computer-readable medium may be embodied in a computer-program product. By way of example, a computer-program product may include a non-transitory computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of power control in a wireless communication device, comprising:
    operating communication resources according to a first subscription to establish an active call at a certain transmit power;
    tuning away the communication resources to operate according to a second subscription, wherein the tuning away occurs after a call duration of the active call;
    operating the communication resources according to the second subscription for a tune away time;
    tuning back the communication resources to the first subscription from the second subscription;
    calculating an adjusted transmit power for the first subscription; and
    operating the first subscription on the adjusted transmit power after the tuning back, wherein calculating the adjusted transmit power comprises:
        determining whether a duration of the tune away time is less than the call duration; and
        calculating a projected open loop transmit power in response to determining that the duration of the tune away time is less than the call duration,
        wherein the projected open loop transmit power is based on a sum of power control bits that were received for a time period prior to start of the tune away time, wherein the time period is equal to the duration of the tune away time.

2. The method of claim 1, wherein calculating the adjusted transmit power for the first subscription further comprises:
    calculating an outer loop transmit power for the first subscription in response to determining that the duration of the tune away time is greater than or equal to the call duration.

3. The method of claim 2, wherein the outer loop transmit power is based on an actual sum of power control bits that were received during the active call until immediately prior to the tuning away.

4. The method of claim 1, further comprising establishing the active call using the first subscription on one wireless network while attempting to acquire communication service using the second subscription on a different wireless network.

5. The method of claim 1, further comprising maintaining a periodic tune away timer and, upon expiration of the periodic tune away timer, tuning back the communication resources to the first subscription from the second subscription.

6. The method of claim 1, wherein tuning away the communication resources to operate according to the second subscription includes page monitoring on the second subscription.

7. The method of claim 1, wherein the active call is a data call on a packet-switched network.

8. The method of claim 1, wherein the active call is a voice call on a circuit-switched network.

9. A wireless communication apparatus, comprising:
    at least one processor
    configured to:
        operate communication resources according to a first subscription to establish an active call at a certain transmit power;
        tune away the communication resources to operate according to a second subscription, wherein the tuning away occurs after a call duration of the active call;
        operate the communication resources according to the second subscription for a tune away time;
        tune back the communication resources to the first subscription from the second subscription;
        calculate an adjusted transmit power for the first subscription; and
        operate the first subscription on the adjusted transmit power after the tuning back,
        wherein the at least one processor is configured to calculate the adjusted transmit power by:
            determining whether a duration of the tune away time is less than the call duration; and
            calculating a projected open loop transmit power in response to determining that the duration of the tune away time is less than the call duration,
            wherein the projected open loop transmit power is based on a sum of power control bits that were received for a time period prior to start of the tune away time, wherein the time period is equal to the duration of the tune away time.

10. The apparatus of claim 9, wherein the at least one processor is further configured to calculate the adjusted transmit power for the first subscription by:
    calculating an outer loop transmit power for the first subscription in response to determining that the duration of the tune away time is greater than or equal to the call duration.

11. The apparatus of claim 10, wherein the outer loop transmit power is based on an actual sum of power control bits that were received during the active call until immediately prior to the tuning away.

12. The apparatus of claim 9, wherein the at least one processor is further configured to:
    establish the active call using the first subscription on one wireless network while attempting to acquire communication service using the second subscription on a different wireless network.

13. The apparatus of claim 9, wherein the at least one processor is further configured to:
    maintain a periodic tune away timer and, upon expiration of the tune away timer, tune back the communication resources to the first subscription from the second subscription.

14. The apparatus of claim 9, wherein the at least one processor is configured to tune away the communication resources to operate according to the second subscription by performing page monitoring on the second subscription.

15. The apparatus of claim 9, wherein the active call is a data call on a packet-switched network.

16. The apparatus of claim 9, wherein the active call is a voice call on a circuit-switched network.

17. A wireless communication device, comprising:
   means for operating communication resources according to a first subscription to establish an active call at a certain transmit power;
   means for tuning away the communication resources to operate according to a second subscription, wherein the tuning away occurs after a call duration of the active call;
   means for operating the communication resources according to the second subscription for a tune away time;
   means for tuning back the communication resources to the first subscription from the second subscription;
   means for calculating an adjusted transmit power for the first subscription; and
   means for operating the first subscription on the adjusted transmit power after the tuning back, wherein means for calculating the adjusted transmit power comprises:
      means for determining whether a duration of the tune away time is less than the call duration, and
      means for calculating a projected open loop transmit power in response to determining that the duration of the tune away time is less than the call duration,
      wherein the projected open loop transmit power is based on a sum of power control bits that were received for a time period prior to start of the tune away time, wherein the time period is equal to the duration of the tune away time.

18. The wireless communication device of claim 17, wherein means for calculating the adjusted transmit power for the first subscription further comprises:
   means for calculating an outer loop transmit power for the first subscription in response to determining that the duration of the tune away time is greater than or equal to the call duration.

19. The wireless communication device of claim 18, wherein the outer loop transmit power is based on an actual sum of power control bits that were received during the active call until immediately prior to the tuning away.

20. The wireless communication device of claim 17, further comprising means for establishing the active call using the first subscription on one wireless network while attempting to acquire communication service using the second subscription on a different wireless network.

21. The wireless communication device of claim 17, further comprising means for maintaining a periodic tune away timer and, upon expiration of the tune away timer, tuning back the communication resources to the first subscription from the second subscription.

22. The wireless communication device of claim 17, wherein means for tuning away the communication resources to operate according to the second subscription includes means for page monitoring on the second subscription.

23. The wireless communication device of claim 17, wherein the active call is a data call on a packet-switched network.

24. The wireless communication device of claim 17, wherein the active call is a voice call on a circuit-switched network.

25. A non-transitory computer-readable medium having stored thereon processor-executable instructions configured to cause a processor of a communication device to perform operations comprising:
   operating communication resources according to a first subscription to establish an active call at a certain transmit power;
   tuning away the communication resources to operate according to a second subscription, wherein the tuning away occurs after a call duration of the active call;
   operating the communication resources according to the second subscription for a tune away time;
   tuning back the communication resources to the first subscription from the second subscription;
   calculating an adjusted transmit power for the first subscription; and
   operating the first subscription on the adjusted transmit power after the tuning back, wherein calculating the adjusted transmit power comprises:
      determining whether a duration of the tune away time is less than the call duration; and
      calculating a projected open loop transmit power in response to determining that the duration of the tune away time is less than the call duration,
      wherein the projected open loop transmit power is based on a sum of power control bits that were received for a time period prior to start of the tune away time, wherein the time period is equal to the duration of the tune away time.

26. The non-transitory computer-readable medium of claim 25, wherein the stored processor-executable instructions are configured to cause the processor of the communication device to perform operations such that calculating the adjusted transmit power for the first subscription further comprises:
   calculating an outer loop transmit power for the first subscription in response to determining that the tune away time is greater than or equal to the call duration.

27. The non-transitory computer-readable medium of claim 26, wherein the outer loop transmit power is based on an actual sum of power control bits that were received during the active call until immediately prior to the tuning away.

28. The non-transitory computer-readable medium of claim 25, wherein the stored processor-executable instructions are configured to cause the processor of the communication device to perform operations further comprising establishing the active call using the first subscription on one wireless network while attempting to acquire communication service using second subscription on a different wireless network.

29. The non-transitory computer-readable medium of claim 25, wherein the stored processor-executable instructions are configured to cause the processor of the communication device to perform operations further comprising maintaining a periodic tune away timer and, upon expiration of the tune away timer, tune back the communication resources to the first subscription from the second subscription.

30. The non-transitory computer-readable medium of claim 25, wherein stored processor-executable instructions are configured to cause the processor of the communication device to perform operations such that tuning away the communication resources to operate according to a second subscription includes page monitoring on the second subscription.

31. The non-transitory computer-readable medium of claim 25, wherein the active call is a data call on a packet-switched network.

32. The non-transitory computer-readable medium of claim 25, wherein the active call is a voice call on a circuit-switched network.

* * * * *